E. R. DRAVER.
WHEEL CARRIER.
APPLICATION FILED MAR. 19, 1917.
1,311,267.
Patented July 29, 1919.
2 SHEETS—SHEET 2.
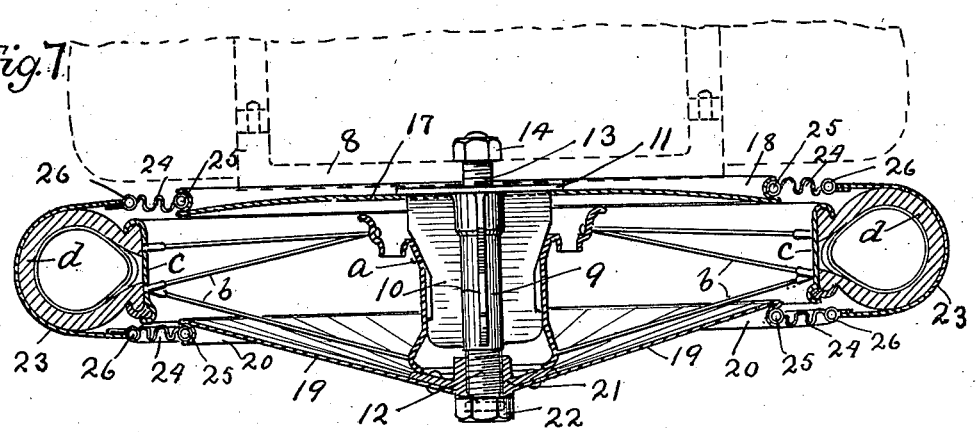
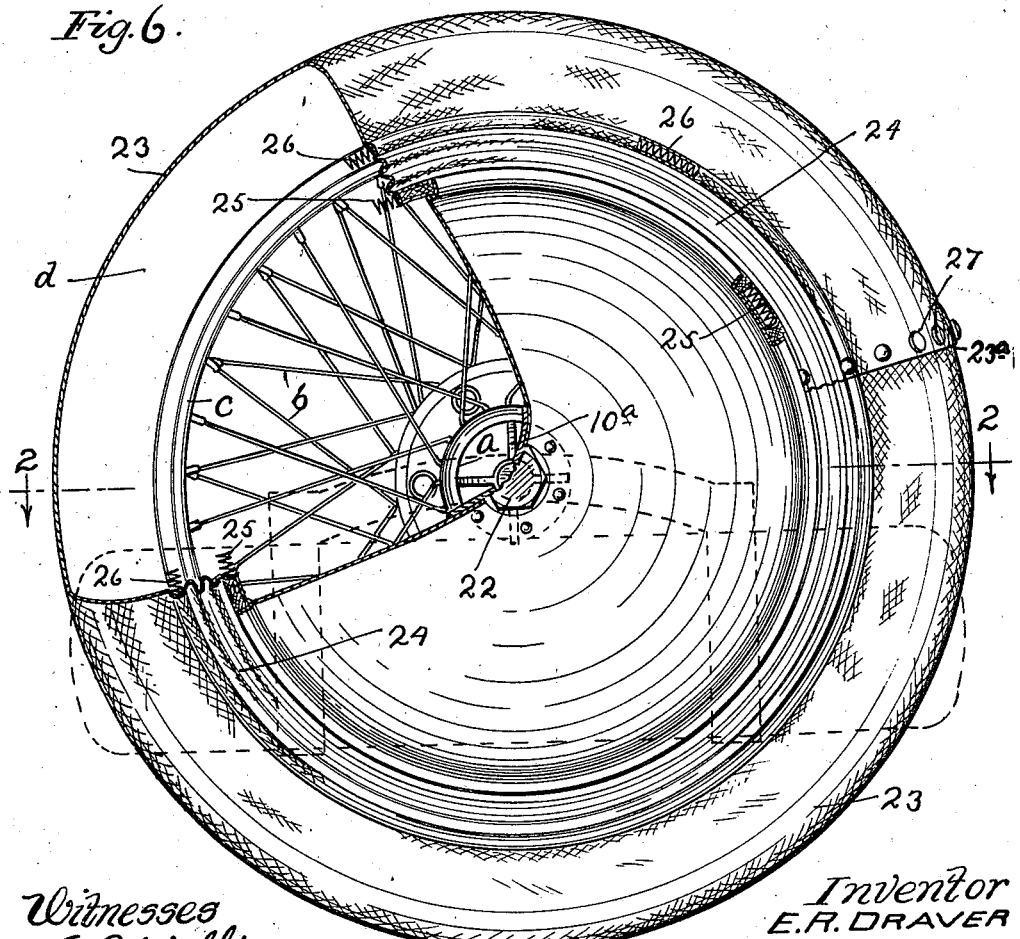
Witnesses
E. C. Wells
H. L. Opsahl.
Inventor
E. R. DRAVER
By his Attorneys
Williamson & Merchant

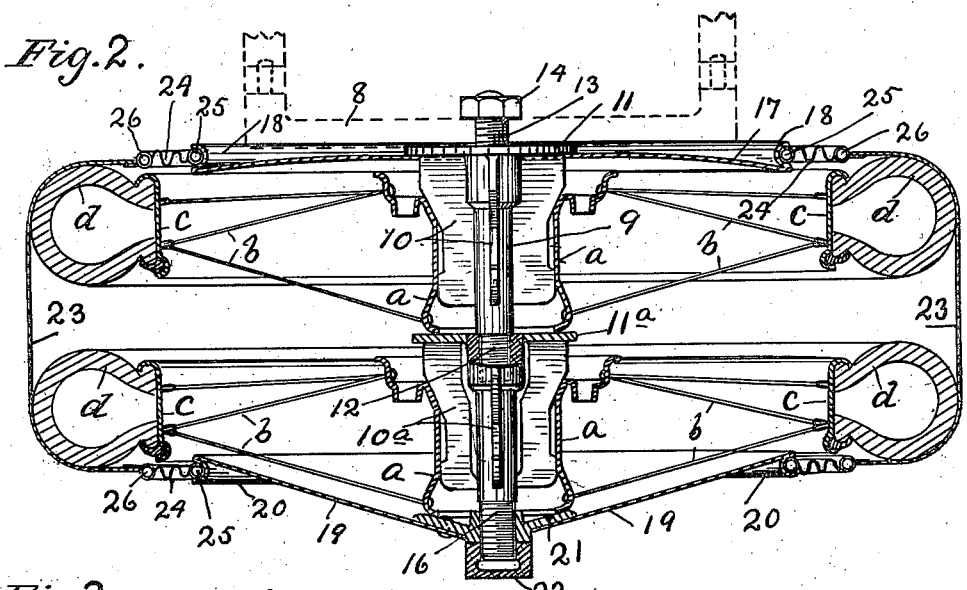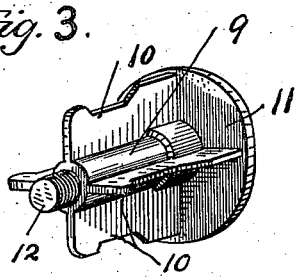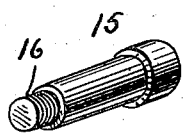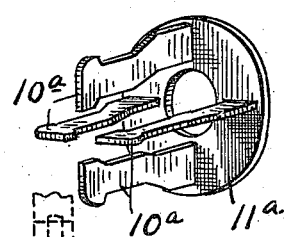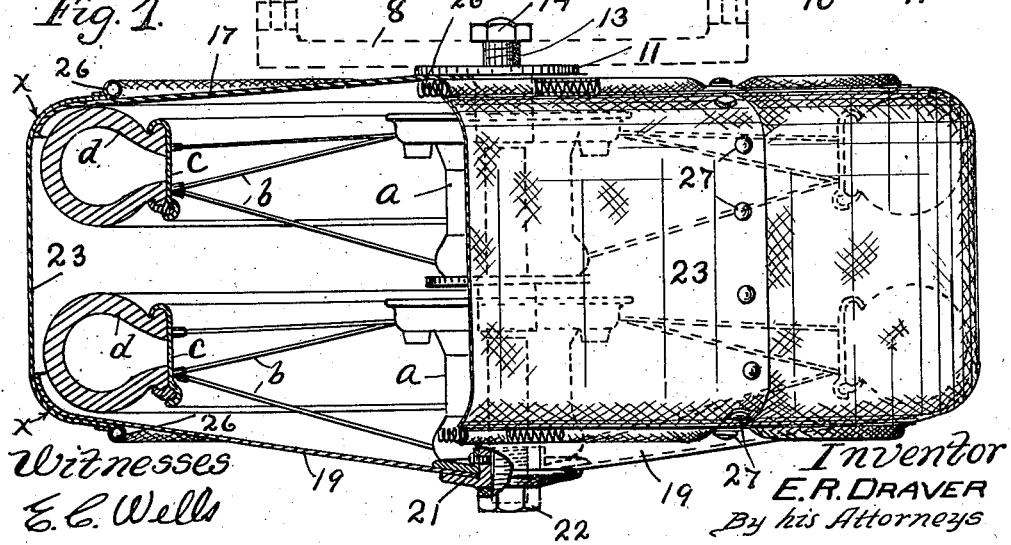

UNITED STATES PATENT OFFICE.

EMIL R. DRAVER, OF RICHMOND, INDIANA.

WHEEL-CARRIER.

1,311,267.  Specification of Letters Patent.  Patented July 29, 1919.

Application filed March 19, 1917. Serial No. 155,647.

*To all whom it may concern:*

Be it known that I, EMIL R. DRAVER, a citizen of the United States, residing at Richmond, in the county of Wayne and State of Indiana, have invented certain new and useful Improvements in Wheel-Carriers; and I do hereby declare the following to be a full, clear, and exact description of the invention, such as will enable others skilled in the art to which it appertains to make and use the same.

My present invention has for its object to provide an extremely simple, highly efficient and convenient wheel carrier and cover adapted for use in connection with automobiles, and especially adapted to carry one or more extra tire-equipped wheels. To such ends, generally stated, the invention consists of the novel devices and combinations of devices hereinafter described and defined in the claims.

From a broad point of view, the combined carrier and cover is adapted for use to carry one or more extra tire-equipped wheels of any character, but inasmuch as it is the universal practice to employ wire wheels on automobiles equipped with extra wheels, rather than with extra rims, the present device is especially designed to support and hold these wire wheels. Wheels now in general use have very large hubs which makes feasible the use of large wheel supporting spindles. To adapt the device to carry either one or two, or for that matter, a larger number of wheels, the wheel carrying spindle is preferably made up of a plurality of disconnectible sections, one of which is permanent, or relatively fixed, and at least one of which is removable, at will. The fixed section or main carrying spindle is rigidly secured to a suitable bracket which is usually rigidly supported from the rear portion of the automobile frame, or in some instances, possibly from the body thereof.

The wheel inclosing casing is made up of a relatively fixed back plate, a removable front plate, and a flexible cover. Both the back and front plates are preferably of sheet metal and are made concavo-convex, to give a maximum strength with a minimum of weight. The flexible cover is preferably an oiled canvas, oil cloth, or similar flexible material, that is engageable with the back and front plates.

In the accompanying drawings which illustrate a commercial form of the invention, like characters indicate like parts throughout the several views.

Referring to the drawings:

Figure 1 is a plan view of the combined carrier and cover showing the same designed to carry two extra tire-equipped wheels, some parts being broken away and some parts being in horizontal section;

Fig. 2 is a horizontal section on the line 2—2 of Fig. 6, and showing a slightly modified form of the device;

Fig. 3 is a perspective view showing the main spindle or relatively fixed section of the multisection spindle;

Fig. 4 is a perspective view showing an extension spindle;

Fig. 5 is a perspective view showing the detachable hub engaging flange of the detachable or extension spindle;

Fig. 6 is a rear elevation of the combined carrier and cover, some parts being broken away, and some parts being sectioned; and Fig. 7 is a view corresponding to Fig. 2, but showing the device adjusted for carrying a single tire-equipped wheel.

The numeral 8 indicates a bracket that is rigidly secured, either to the rear portion of an automobile frame, or to the rear portion of the body thereof, and which serves to support the combined carrier and cover. The main spindle or fixed section of the multisection spindle is preferably constructed as best shown in Figs. 2 and 3, and it comprises an axial portion 9, radial hub engaging flanges 10, a disk-like flange 11 and threaded axially projecting front and rear stems 12 and 13. The rear threaded stem 13 projects through a perforation in the bracket 8 and is clamped thereto by a nut 14.

This extension spindle 15 (see Figs. 2 and 4) is provided at its rear end with a threaded socket adapted to be screwed onto the threaded stem 12, and at its front end, is provided with a threaded stem 16 of the same size and thread as the said stem 12. This extension spindle, instead of having rigidly attached hub engaging flanges 10 and a disk-like flange 11, is provided with corresponding elements 10$^a$ and 11$^a$, respectively, that are removable therefrom. These elements 10$^a$ and 11$^a$ (see particularly Fig. 5) are rigidly connected, and the disk-like flange 11$^a$ is provided with an axial perforation and is adapted to be freely slid onto and off from the said extension spindle 15. This feature is important, as will presently appear.

The back plate 17 of the cover, which, as noted, is a sheet metal structure and made slightly concave-convex, is riveted, welded, or otherwise rigidly secured to the back flange 11 of the fixed spindle, and in Figs. 2, 6 and 7 it is shown as formed at its rim with a channel-shaped annular flange 18, while in the construction shown in Fig. 1, the rim of said plate is simply turned inward.

The front plate 19 of the cover, which, as also noted, is a concave-convex sheet metal structure, is in Figs. 2, 6 and 7 provided at its rim with a channel-shaped annular flange 20, while in Fig. 1 the rim of said plate is simply turned inward. This front plate 19, being a removable element, is provided at its axis with a rigidly secured hub 21 which is preferably threaded, so that it may be screwed, at will, either onto the threaded stem 12 or onto the threaded stem 16; but this hub 21 might be threadless and freely seated around the threads of the said stems and a nut used outside.

When converted for carrying two wheels, as shown in Figs. 1 and 2, the hub 21 is applied on the threaded stem 16 of the extension spindle 15, and a nut 22, preferably a cap nut, is screwed onto the said stem 16 to securely clamp the plate 19 and the two wheels in position on the carrying spindle.

The wire wheels shown are of standard construction and the parts thereof may be briefly noted as follows: $a$ indicates the wheel hubs, $b$ the spokes, $c$ the rims and $d$ the pneumatic tires of said wheels.

The hub of the rear extra wheel is slipped onto the flanges 10 of the main spindle. The detachable spindle elements $10^a$ and $11^a$ are removable from the extension spindle. When a second extra wheel is to be applied, the said elements $10^a$ and $11^a$ are slipped onto the extension spindle 15 and the hub of the said second wheel is slipped over the flanges $10^a$. Then the front plate 19 is applied and secured by applying the nut 22 to the projecting end of the said threaded stem 16. Note the hub of the second wheel engages $10^a$ which engages with the end of the hub of the first wheel and thus the nut 22 clamps both wheels.

When the plate 19 is removed, the rear or outer extra wheel may, of course, be freely removed from the spindle, but when the front or inner wheel is to be removed, the elements $10^a$ and $11^a$ must, of course, be removed from the extension spindle.

In the construction illustrated in Figs. 2, 6 and 7, the flexible tire cover 23 is provided at both edges with pliable annular diaphragms 24 and these diaphragms are provided at their inner and outer edges, respectively, with tension bands 25 and 26. These tension bands are concentric and preferably elastic. Furthermore, the said elastic tension bands are preferably long coiled springs contained in hems formed in the said annular diaphragms. The said diaphragms, so-called, may be formed by extension of the cover, or may be of a different material suitably attached thereto. The flexible cover thus formed is annular, but is transversely split at one point, to-wit, as shown at $23^a$ and the overlapping ends thereof are provided with suitable fasteners, such as separable snap fasteners of the glove fastener type indicated at 27. Of course, the diaphragms in the ends of the elastic tension bands 25 and 26, are anchored to the lapped ends of the flexible cover and its diaphragms, so that the entire flexible cover element may be opened up for application to, or removal from the tires. When the said cover is applied, the inner elastic tension bands 25 will be closely seated in the channel-shaped annular flange of the front and back plates, thus forming a dust-tight joint therewith; and the outer tension bands 26 will draw the flexible cover proper taut over the tires.

In the drawings, the outer tension bands 26 are shown as located inward nearly as far as the innermost portions of the tires.

Figs. 1, 2 and 3 show the combined wheel carrier and cover as adjusted for use to carry two extra wheels, while Fig. 7 shows the same used to carry but a single wheel. As illustrated, flexible tire covers of different widths are used for the two above purposes.

When a single wheel is to be carried, the spindle extension 15 and its detachable flange element $10^a$—$11^a$, will be removed, and in this adjustment also, of course, the outer cover plate 19 will be slipped onto the projecting end of the spindle 9 and the nut 22 applied to the threaded stem 12 of the latter.

When the device is adjusted for carrying two wheels, as shown in Figs. 1 and 2, the outer cover plate directly holds the outer wheel in position and the disk-like flange $11^a$ then engages the hub of the inner wheel and holds it in position on the inner or fixed section of the spindle. In the construction illustrated in Fig. 1, the flexible so-called annular cover does not have the distinctly formed annular diaphragms, but does have the elastic or flexible clamping bands 26 which in this construction draw the edges of the cover 23 firmly against the sides of the outer portions of the back and front plates 17 and 19 respectively. These clamping bands 26 might be arranged to clamp the edges of the flexible cover against the rims of the front and back plates, at points as far out as indicated at $x$—$x$ on Fig. 1.

By reference to Fig. 1 which illustrates the preferred form of the carrier, it will be noted that ample clearance for variation in tires is provided, and that the annular cover is supported entirely from the rims or marginal portions of the inner and outer plates and does not, of necessity, have contact with the tires. The important feature is found in the fact that this so-called annular cover (which, as noted, is split or divided, but is of annular form when applied) engages and makes close contact with the rims of the inner and outer plates and bridges the space between the two so as to complete the wheel inclosing casing.

The device, as is evident, from the above, is usually convertible from one adapted to carry a single wheel into one adapted to carry two wheels; and by carrying out the same idea, it might be adapted to carry more than two wheels, although it will probably never be desirable to carry more than two extra wheels. Moreover, the device is of simple construction and very efficient and convenient for the purposes had in view.

The spindle with detachable section, however makes it possible for a person to buy a carrier for one wheel and thereafter to easily convert it into a carrier for two wheels, simply by the addition of the elements 15 and 10ª—11ª and a wider flexible cover 23.

What I claim is:

1. An extra wheel carrier for vehicles, comprising a wheel supporting spindle, with means for securing the same to a vehicle, a metallic back plate applied to the inner portion of said spindle and adapted to close the inner side of the wheel on said spindle, an outer plate removably mounted on the outer portion of said spindle and adapted to close the outer side of a wheel on said spindle, and means on the outer end of said spindle for forcing said front plate toward said back plate to secure one or more wheels on said spindle with their spokes inclosed and protected by said plates.

2. An extra wheel carrier for vehicles, comprising a wheel supporting spindle, with means for securing the same to a vehicle, a metallic back plate applied to the inner portion of said spindle and adapted to close the inner side of the wheel on said spindle, an outer plate removably mounted on the outer portion of said spindle and adapted to close the outer side of a wheel on said spindle, and means on the outer end of said spindle for forcing said front plate toward said back plate to secure one or more wheels on said spindle with their spokes inclosed and protected by said plates, and an annular cover detachably applied to the rim portions of said two plates, bridging the spaces between the same and completing the inclosure of the wheel or wheels on said spindle.

In testimony whereof I affix my signature in presence of two witnesses.

EMIL R. DRAVER.

Witnesses:
 ARCHIE FOWLER,
 OWEN DRAVER.